Dec. 31, 1957    J. A. DUPPS    2,818,165
SCREW CONVEYOR
Filed Dec. 7, 1954
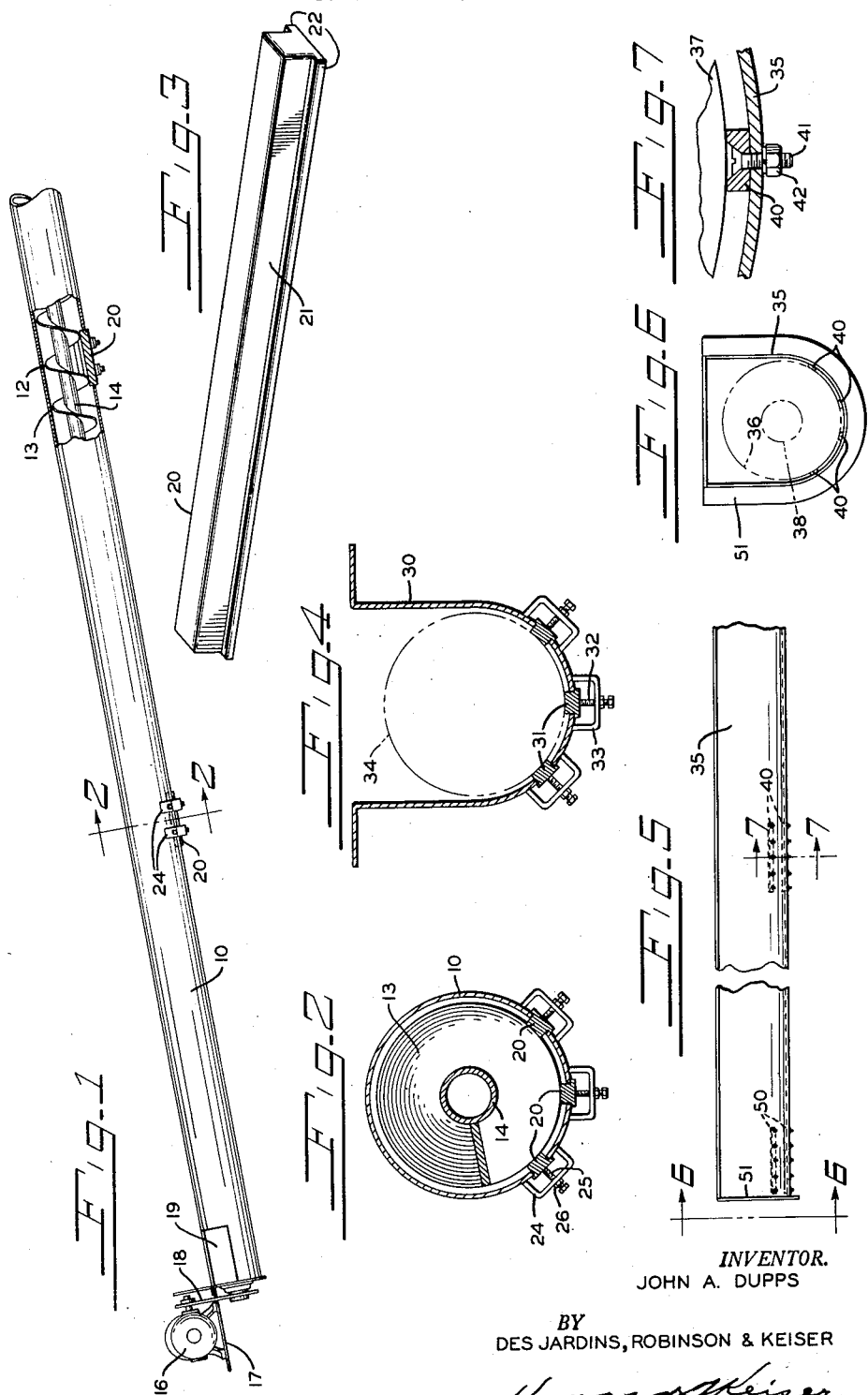
INVENTOR.
JOHN A. DUPPS
BY
DES JARDINS, ROBINSON & KEISER
HIS ATTORNEYS United States Patent Office 2,818,165
Patented Dec. 31, 1957

2,818,165

SCREW CONVEYOR

John A. Dupps, Germantown, Ohio, assignor to The Dupps Company, Germantown, Ohio, a corporation of Ohio Application December 7, 1954, Serial No. 473,637

5 Claims. (Cl. 198—213)

The invention relates to screw conveyors and, more particularly, to means for supporting the conveyor screw within the trough at spaced locations along the length thereof in such a manner as not to interfere with the flow of material through the trough.

In the past it has been customary to provide hanger bearings at spaced intervals along the length of the screw conveyor for supporting the screw within the trough. With this type of construction, the flight of the conveyor screw must be interrupted at each bearing location to permit the hanger to extend into the center of the trough and provide support for the shaft of the conveyor screw. When a conveyor of this sort is run with a full trough, the hanger bearings present an obstruction to the flow of material through the trough and, with certain materials such as offal, and other non-granular substances, the build-up in front of the hangers may become so great as to completely obstruct the flow of material through the conveyor.

To eliminate this difficulty and to simplify the construction of the conveyor, I have devised a new form of support bearing for the conveyor screw which will not block the flow of material through the trough and which will permit the use of a continuous flight from one end of the screw to the other. This bearing consists of several longitudinally extending bars secured to the bottom of the trough on which the flight of the conveyor screw may ride as it revolves within the trough. The bars may either be bolted directly to the trough, where this is possible, as in the case of U- or V-shaped troughs, or they may be inserted in slots provided in the wall of the trough so as to enable installation from the outside of the trough which is very important in the case of conveyors having cylindrical troughs.

Accordingly, it is an object of my invention to provide an improved form of bearing for supporting the screw of a spiral conveyor within the conveyor trough.

Another object of my invention is to provide a bearing for a conveyor screw which coacts with the flight of the screw to support it within the conveyor trough.

Another object of my invention is to provide a bearing for a screw conveyor which consists of a set of longitudinally disposed riding bars projecting inwardly from the wall of the trough which are adapted to cooperate with the edge of the flight and support it within the trough.

Another object of my invention is to provide means for enabling the riding bars to be installed from the outside of the trough.

With these and other objects in view which will become apparent from the following description, the invention includes certain novel features of construction and combinations of parts the essential elements of which are set forth in the appended claims and a preferred form or embodiment if which will hereinafter be described with reference to the drawings which accompany and form a part of this specification.

In the drawings.

Fig. 1 is a side elevation of a portion of a screw conveyor provided with my improved form of bearings for supporting the conveyor screw.

Fig. 2 is a cross sectional view taken along the line 2—2 in Fig. 1.

Fig. 3 is a perspective view of one of the riding bars shown in Figs. 1 and 2.

Fig. 4 is a cross sectional view showing my improved form of bearing as applied to a U-trough conveyor.

Fig. 5 is a side elevation of a portion of a screw conveyor having a U-shaped trough and a modified form of riding bars for supporting the screw.

Fig. 6 is an end view of the conveyor shown in Fig. 5, this view being taken along the line 6—6 in Fig. 5.

Fig. 7 is a fragmentary cross sectional view taken along the line 7—7 in Fig. 5.

In Fig. 1 of the drawings I have shown my invention as applied to a cylindrical trough type of screw conveyor, the trough being designated generally by the reference numeral 10 and the screw running inside the trough being designated by the reference numeral 12. The screw includes a spiral flight 13 mounted on a tubular shaft 14 which may be rotated within the trough by any suitable form of power drive. In the present instance, the power drive consists of an electric motor 16 supported on a platform 17, the motor being connected with the screw shaft 14 by means including a belt drive 18 fitted to driving and driven pulleys carried by the motor and screw shafts. A feed box 19 is provided at the left-hand end of the trough 10 for receiving the material to be conveyed.

As shown in Fig. 2, the diameter of the flight 13 is somewhat smaller than the inside diameter of the cylindrical trough 10 so as to provide clearance between the edge of the flight and the walls of the trough so that the conveyor screw may run freely therein. Even though such clearance is provided, it is necessary in the case of all conveyors except those of very short lengths to provide bearings for supporting the screw at one or more points intermediate its ends to prevent the edges of the flight from rubbing on the bottom of the conveyor trough due to sag in the shaft 14. As mentioned earlier herein, it has been customary in the past to support the shaft 14 at intermediate points by means of hanger bearings supported from the trough 10 and engaging with the shaft 14 to hold the screw off the bottom of the conveyor trough. As hereinbefore stated, this method of supporting the screw has proven unsatisfactory in many instances due to the tendency of the material being transported through the conveyor to dam up behind the hangers, and also because of the expense involved in this type of construction and the necessity of making provision for access to the bearings for purposes of adjustment and lubrication.

To overcome these disadvantages, I have provided a new form of support bearing for the conveyor screw at intermediate points along the length of the conveyor, this bearing taking the form of sets of riding bars located at intervals along the length of the conveyor, the bars projecting inwardly from the walls of the trough in the bottom part thereof to contact the edges of the flight and hold the same off the bottom of the trough 10. As shown in Fig. 2, there are three of these bars 20 at each of the bearing locations, one of the bars being shown in detail in Fig. 3. As shown, each bar consists of a body portion 21 and a pair of longitudinally extending lips or shoulders 22 formed along the outer edge of the bar. The trough 10 is provided with rectangular slots corresponding to the length and width of the portion 21, there being three such slots arranged in parallel relation and spaced circumferentially around the bottom of the trough as shown in Fig. 2. The portions 21 of the bars 20 project through the slots and the lips 22 engage with the outer face of the trough along each edge of the slots to limit the inward movement of the bars through the slots. Lying over each slot is a pair of bridge members 24 each of which is provided with a tapped hole for receiving a clamp bolt 25 which may be locked in place by a lock nut 26. By tightening down the bolts 25 against the backs of the bars 20, the latter are forced into the trough and against the edges of the flight 13 so as to elevate the screw off the bottom of the trough and provide a peripheral bearing for the conveyor screw.

As seen in Figs. 1, 2 and 3, the bars 20 are rather narrow in width and long enough to span the distance between adjacent turns of the flight 13 so that at least one edge of the flight is always in contact with the face of the bar to support it within the trough 10. It has been found that riding bars made of brass give very satisfactory service in conveyors provided with flights made of mild steel, though any other material dissimilar to that of the flight and capable of providing a low coefficient of friction with the material of the flight might be used. Thus, bars made of lignum vitae, cast iron, Monel metal or nylon might be used with flights made of mild steel, aluminum or stainless steel. This, however, forms no part of my invention and I do not wish to limit myself to any particular combination of materials which might be used for the flight and the riding bars.

The type of construction for the bearings shown in Figs. 1, 2 and 3 is particularly adapted for use with screw conveyors of the cylindrical trough type in which it would be very difficult if not impossible to apply the riding bars to the inner face of the trough by means of screws, bolts, etc. With the form of the device herein shown, the bars may be installed, or removed for replacement, from the outside of the trough by merely releasing the clamp bolts 25 to permit the bars to be slid beneath the bridge members 24 and pushed into the slots provided therefor in the wall of the trough 10. The bar may then be clamped and locked into place by the bolt 25 and lock nut 26.

This same type of bearing construction may also be applied to other forms of screw conveyors and, although the use of this form of support bearing is not absolutely essential in the case of open troughs such as the U-shaped trough 30 shown in Fig. 4, it provides, with any shape of trough, a simple and facile method of replacing the worn riding bars with new ones. As shown in Fig. 4, riding bars 31 corresponding to the previously described bars 20 may be installed in the bottom of the trough 30 through slots provided therefor in the wall of the trough, the bars being held in place by clamp screws 32 threaded into bridge members 33. The set of bars 31 provide a support bearing for the screw 34 riding in the trough 30.

In Figs. 5, 6 and 7 of the drawings, I have shown a modified form of my invention wherein there is shown a screw conveyor having a U-shaped trough indicated generally by reference numeral 35 in which is located a conveyor screw 36 (Fig. 6). As in the case of the previously described conveyor, the screw includes a flight 37 (Fig. 7) mounted on a shaft 38 (Fig. 6) and driven by any suitable form of power drive. The screw is supported intermediate its ends by one or more sets of riding bars 40 which are secured in place inside the bottom of the trough 35 by means of screws 41 the heads of which are countersunk so as to lie below the surface of the bar 40. Nuts 42 are applied to the screws on the outside of the trough so as to hold the bars securely in place within the trough.

As shown in Fig. 5, a similar form of bearing is provided to support the end of the conveyor screw, this bearing being comprised of riding bars 50 fastened to the inner wall of the trough at the left-hand end thereof. The bars 50 may be similar to the bars 40 and, like those bars, may be secured in place by fastening screws or bolts extending through the walls of the trough. The left-hand end of the conveyor may be left open to form a discharge opening for the material being transported through it, or it may be closed by a cover plate secured to a flange 51 formed on the end of the trough. The end bearing constituted by the riding bars 50 functions in the same manner as the intermediate bearings formed by riding bars 40, the bars supporting the end of the screw 36 by contact with the edges of the flight 37.

While I have described my invention in connection with one possible form or embodiment thereof and have used, therefore, certain specific terms and language herein, it is to be understood that the present disclosure is illustrative rather than restrictive and that changes and modifications may be resorted to without departing from the spirit or scope of the claims which follow. For example, the riding bar bearings might be used to advantage in a vertical screw conveyor, the bars being spaced around the entire periphery of the cylindrical trough in this case, so as to prevent contact between the flight and the trough in all directions.

Having thus described my invention, what I claim as new and useful and desire to secure by United States Letters Patent, is:

1. In a screw conveyor having a trough for carrying the material to be handled and a feed screw in said trough provided with a helical flight for moving the material through the trough, the invention comprising a peripheral support bearing for journaling said feed screw for rotation in said trough, said bearing comprising a plurality of spaced riding bars disposed longitudinally within said trough and projecting inwardly through slots provided in the trough wall so as to engage with the peripheral edge of the flight and support the screw in said trough, said bars each having a length of from one to three times the pitch of the flight on the feed screw, and oppositely disposed flanges on said bars overhanging the portion of the trough wall at the margin of said slots for bearing against the outer face of said trough wall for limiting the entrance of the bars therein.

2. The screw conveyor of claim 1 including means mounted on the outside of said trough for holding said bars in place in the slots.

3. The screw conveyor of claim 2 wherein said means includes a U-shaped member on said trough bridging said slot, and a clamp bolt carried by said member for engaging said bar.

4. In a screw conveyor having a trough for carrying the material to be handled and a feed screw in said trough provided with a helical flight for moving the material through the trough, the invention comprising a peripheral bearing for journaling said feed screw for rotation in said trough, said bearing comprising a plurality of longitudinally extending slots in the wall of said trough, a riding bar receivable in each of said slots from outside the trough and extending into said trough for engaging with the peripheral edge of the flight and supporting said feed screw for rotation in said trough, and each of said riding bars being provided with a pair of laterally extending flanges adapted to engage against the outer face of the trough wall and limit the entrance of said bars into the trough.

5. The screw conveyor of claim 4 wherein the length of said riding bars is from one to three times the pitch of the feed screw.

References Cited in the file of this patent

UNITED STATES PATENTS

| 843,676 | Gustavsen | Feb. 12, 1907 |
| 1,593,251 | Fintermann | July 20, 1926 |
| 2,731,967 | Hoeksema | Jan. 24, 1956 |

FOREIGN PATENTS

| 38,177 | Germany | Feb. 18, 1886 |